April 14, 1959     I. L. CRAWFORD     2,881,802
MULTI-WAY VALVE UNIT HAVING ROTARY SELECTOR VALVE
Filed June 21, 1957     2 Sheets-Sheet 1

INVENTOR.
IVAN L. CRAWFORD,
BY
McMorrow, Berman & Davidson
ATTORNEYS.

April 14, 1959     I. L. CRAWFORD     2,881,802
MULTI-WAY VALVE UNIT HAVING ROTARY SELECTOR VALVE
Filed June 21, 1957     2 Sheets-Sheet 2

INVENTOR.
IVAN L. CRAWFORD,
BY
McMorrow, Berman + Davidson
ATTORNEYS.

United States Patent Office 2,881,802
Patented Apr. 14, 1959

2,881,802

MULTI-WAY VALVE UNIT HAVING ROTARY SELECTOR VALVE

Ivan L. Crawford, Ketchikan, Alaska

Application June 21, 1957, Serial No. 667,242

2 Claims. (Cl. 137—622.5)

This invention relates to valves, and more particularly to a multiple position valve for selectively connecting a first conduit to any one of a plurality of branch conduits.

The main object of the invention is to provide a novel and improved selector valve which is simple in construction, which is easy to operate, and which is relatively compact in size.

A further object of the invention is to provide an improved selector valve which is relatively inexpensive to fabricate, which is protected against leakage, which is durable in construction, and which is especially suitable for selectively connecting a hydraulic fluid supply conduit to a selected one of a plurality of branch conduits leading to hydraulically operated devices, such as individual wheel jacks for automobiles or similar vehicles.

Further objects and advantages of the invention will become apparent from the following description and claims, and from the accompanying drawings, wherein:

Figure 1:
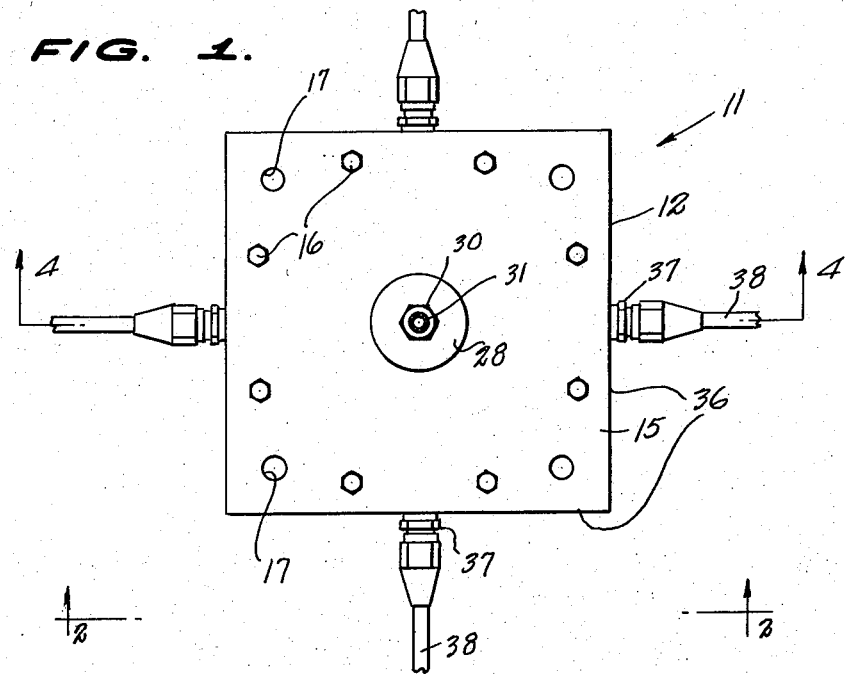
Figure 1 is a cross sectional view taken substantially on the line 1—1 of Figure 2, and showing a selector valve according to the present invention in rear elevational view.

Referring to the drawings, the improved selector valve is designated generally at 11 and comprises a generally rectangular housing 12, said housing having a main body portion 13 and respective rectangular front and rear cover plates 14 and 15. The cover plates 14 and 15 are secured to the intermediate main body portion 13 by a plurality of transversely extending bolts 16. The plate members 14 and 15 and the block 13 intervening therebetween are further apertured, as shown at 17, the apertures providing a means for securing the housing 12 to a suitable support, for example, to a wall plate 18, by means of suitable bolts or similar fasteners extending through the apertures 17 and through the wall plate.

The body 13 is formed with a cylindrical cavity 19 located substantially centrally thereof, and rotatably mounted in said cavity is the cylindrical valve rotor 20, said valve rotor having a central boss 21 extending rotatably through a circular central aperture 22 formed in the front cover plate 14. Axially secured to the boss 21 is a shaft element 23, and secured to said shaft element 23 by a universal joint connection 24 is a handle shaft 25 which is employed to manually rotate the cylindrical valve rotor 20 in the housing 12.

Figure 2:
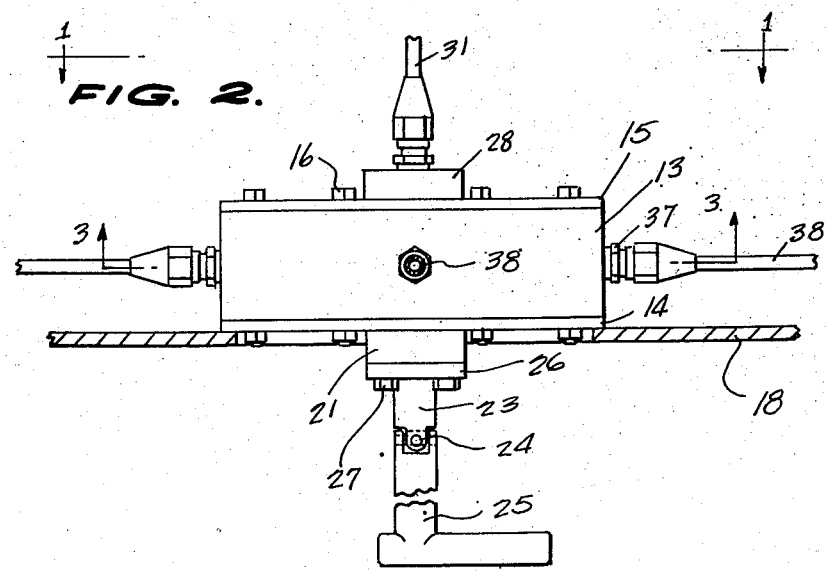
Figure 2 is a cross sectional view taken on the line 2—2 of Figure 1 and providing a bottom view of the selector valve.
Figure 4:
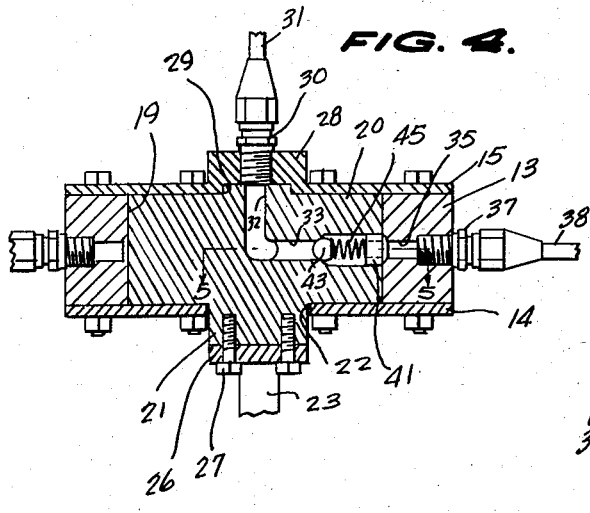
Figure 4 is a horizontal cross sectional view taken on the line 4—4 of Figure 1.

As shown in Figures 2 and 4, the shaft member 23 is provided with a connection flange 26 which is rigidly secured to the boss 21 in any suitable manner, as by a plurality of fastening bolts 27.

The rear cover plate 15 is centrally formed with an outwardly projecting boss 28 in which is rotatably received a bearing boss 29 centrally formed on the valve rotor 20. The stationary boss 28 is suitably tapped to receive a conventional inlet conduit fitting 30 to which is connected a flexible conduit 31 which may be connected to a suitable fluid supply when the valve is to be employed for distributing fluid to selected fluid-operated devices, as will presently be described.

Figure 5:
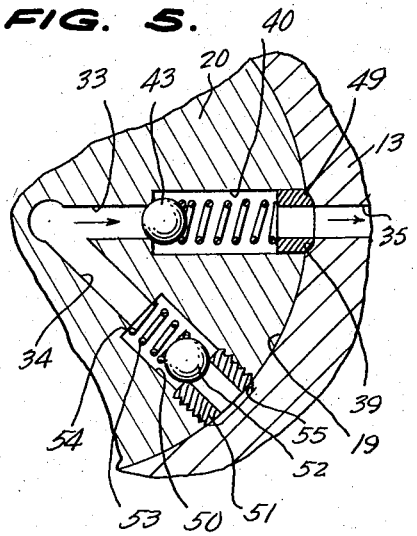
Figure 5 is an enlarged cross sectional detail view taken on the line 5—5 of Figure 4.
Figure 6:
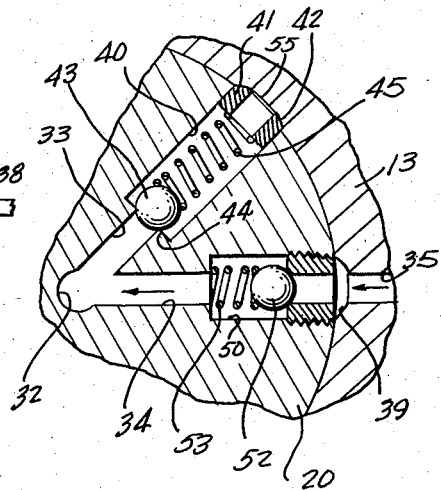
Figure 6 is a cross sectional detail view similar to Figure 5 but showing the valve rotor adjusted to exhaust position.

The valve rotor 20 is formed with an axial passage 32 communicating with the conduit fitting 30, and is further formed with a pair of radial passages 33 and 34 communicating with the axial passage 32 and extending at an angle of 45° relative to each other, as is shown in Figures 5 and 6.

Figure 3:
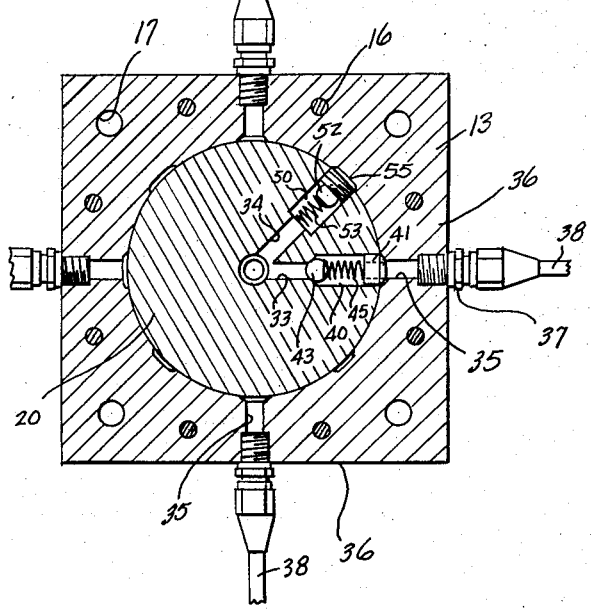
Figure 3 is a vertical cross sectional view taken on the line 3—3 of Figure 2.

The stationary valve body 13 is formed with four passages 35 extending substantially perpendicular to the respective edges 36 of the body, whereby said passages are spaced angularly from each other by 90° angles, as is clearly shown in Figure 3, the passages 35 communicating with the cylindrical internal bore 19 of the body and being tapped to receive respective conventional fluid conduit fittings 37 at their outer ends, as is clearly shown in Figures 1, 2, 3 and 4. Respective conduits 38 are connected in a conventional manner to the conduit fittings 37, said conduits 38 leading to respective fluid-operated devices, such as to the cylinders of hydraulic jacks associated with the respective individual wheels of an automobile.

The inner ends of the passages 35 are formed with conical seats 39, as shown in Figures 5 and 6, and the passage 33 of the valve rotor 20 is formed with an enlarged cylindrical bore portion 40 in which is slidably mounted an annular sealing sleeve 41 having a conical end portion 42 sealingly engageable in a selected one of the conical seats 39. A check valve ball 43 is provided in the bore 40, said ball 43 being engageable against the annular shoulder 44 defined at the inner end of bore 40, the ball 43 being biased against said shoulder 44 by a coiled spring 45 bearing between the ball 43 and the sealing sleeve 41. As will be readily apparent from Figure 5, the sealing sleeve 41 may be engaged in a selected conical seat 39, whereby to yieldably lock the valve rotor 20 in a position connecting the passage 33 to the selected conduit 38 through the check valve defined by the ball 43 and shoulder 44.

The passage 34 is formed with an enlarged bore portion 50 in the end of which is threadedly engaged a bushing 51 against which is disposed a check valve ball 52, the ball 52 being biased against the rim of the bushing 51 by a coiled spring 53 bearing between the ball and the annular shoulder 54 defined at the inner end of bore 50. The bore 19 is formed with conical recesses 55, spaced at 45° angles to the previously described conical seats 39 and being adapted to receive the conical ends 42 of the sleeve members 49 when the valve rotor 20 is adjusted to a position wherein the bore 34 is aligned with a selected passage 35 in the valve body 13.

Therefore, by rotating the handle member 25, the valve rotor 20 may be adjusted to a position wherein the radial fluid passage 33 is aligned with a selected passage 35 in the valve body, and whereby the fluid conduit 31 is thus connected to a selected branch conduit 38 through the check valve defined by ball 43 and shoulder 44. This allows fluid to be distributed through the valve to the selected conduits 38, and hence to the selected fluid-operated device, for example, to one of the hydraulic jack devices employed with the individual wheels of an automobile, in a system employing such individual jacks.

This position of the valve rotor 20 is illustrated in Figure 5, wherein the sealing sleeve 49 is seated in the conical recess 39 associated with the selected outlet passage 35, whereby the valve rotor 20 is yieldably locked in its selected position. To allow the fluid cylinder to discharge its contents, whereby to release same, the valve rotor 20 is rotated by means of the handle member 25 to an angle of 45°, to bring the passage 34 into alignment with the passage 35 associated with the selected cylinder, whereby the pressure in the cylinder causes the ball 52 to unseat, to allow the fluid to exhaust back through the valve to a suitable reservoir associated with the fluid supply. Said fluid supply is provided with suitable conventional valve means, not shown, enabling the conduit 31 to be employed as a return conduit to allow the fluid to discharge to the reservoir of the system.

When the valve is adjusted to its exhaust position, shown in Figure 6, the sleeve member 41 is seated in a recess 42, as shown, whereby to yieldably lock the valve rotor 20 in the exhaust position, and whereby to maintain the passage 34 in alignment with the valve passage 35 associated with the selected cylinder to be exhausted.

When the valve rotor is arranged in the position of Figure 5, namely, in the driving position thereof, the fluid is forced past the check valve ball 43, the fluid pressure causing the ball to unseat, whereby to allow the fluid to pass through the bore portion 40 and to discharge through the selected passage 35. Leakage of the fluid is substantially prevented by the sealing engagement of the sleeve member 49 in its associated recess 39. The fluid pressure acts against the check valve ball 52, maintaining the bore 50 closed, thereby preventing leakage of the fluid past the bushing 51 when the valve is adjusted to the driving position thereof shown in Figure 5.

When the valve rotor is adjusted to the exhaust position thereof, shown in Figure 6, the returning fluid acts against the ball 52 to unseat same, overcoming the biasing force of the spring 53, whereby the returning fluid passes through the passage 34 and discharges from the valve rotor 20 through the passage 32 and into the conduit 31. The returning fluid, being at relatively low pressure, since it is exposed to reservoir pressure, after it has passed through passage 34 exerts relatively small force on the ball 43 and thus does not leak past the ball into the bore 40.

While a specific embodiment of an improved selector valve has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A selector valve comprising a stationary valve body formed with a plurality of outlet passages, a valve rotor mounted in said body, said valve rotor being formed with an axial passage, said valve body being formed with an inlet passage registering with said axial passage, the valve rotor being formed with a pair of radial passages extending at an acute angle to each other and communicating with said axial passage, the valve body being formed with detent recesses adjacent the periphery of the valve rotor and being angularly spaced from the respective outlet passages by said acute angle, oppositely acting check valves in the respective radial passages, and a yieldable sealing element in the end of one of said radial passages engageable in one of the detent recesses to lock the valve rotor in a position wherein the other radial passage of the valve rotor registers with a selected outlet passage.

2. A selector valve comprising a stationary valve body formed with a plurality of outlet passages having recessed inner ends, a valve rotor mounted in said body, said valve rotor being formed with an axial passage, said valve body being formed with an inlet passage registering with said axial passage, the valve rotor being formed with a pair of radial passages extending at an acute angle to each other and communicating with said axial passage, the valve body being formed with detent recesses in the same radial plane as said recessed inner ends, said detent recesses being located adjacent the periphery of the valve rotor and being angularly spaced from the respective outlet passages by said acute angle, oppositely acting check valves in the respective radial passages, and a yieldable sealing element in the end of one of said radial passages selectively engageable in one of the detent recesses or recessed inner ends of the outlet passages to yieldably lock the valve rotor in a position wherein a selected one of the radial passages of the valve rotor registers with a selected outlet passage.

References Cited in the file of this patent

UNITED STATES PATENTS

| | | |
|---|---|---|
| 825,370 | Zurbuch | July 10, 1906 |
| 1,510,129 | Argy | Sept. 30, 1924 |
| 2,165,096 | Frechette | July 4, 1939 |
| 2,254,341 | Zaikowsky | Sept. 2, 1941 |
| 2,781,056 | Carufel | Feb. 12, 1957 |
| 2,419,481 | Carbon | Apr. 22, 1947 |